Jan. 12, 1960     L. E. LEIST     2,920,668
HACKSAW
Filed March 17, 1959
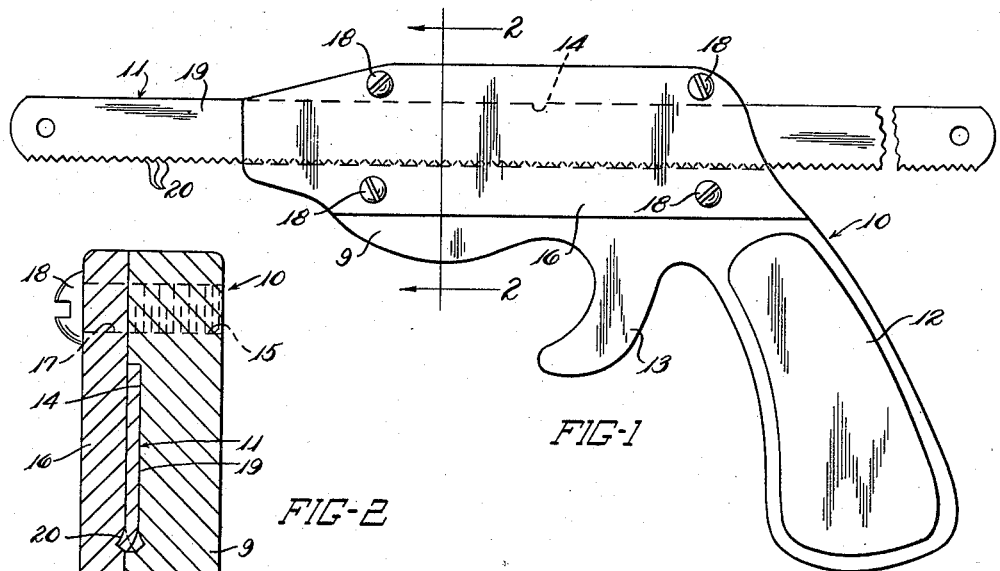
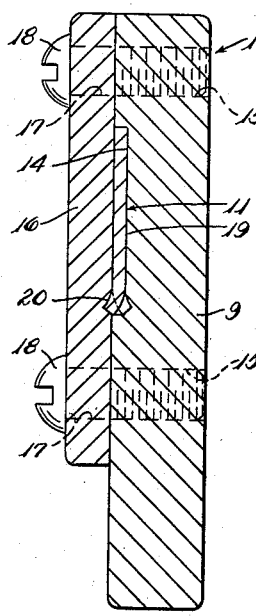
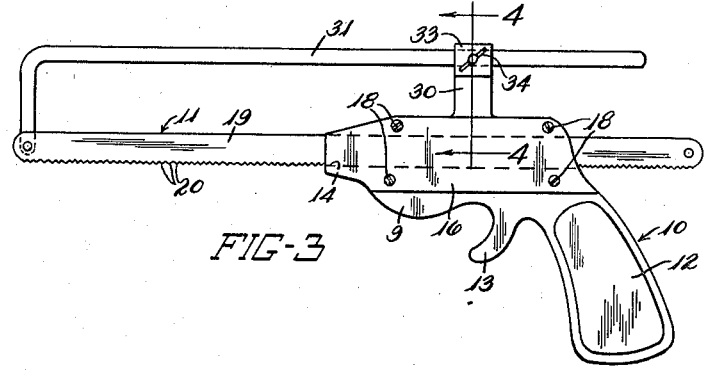
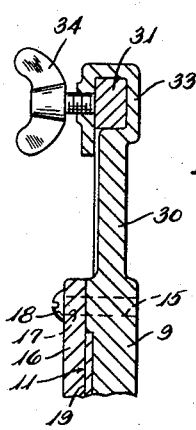
INVENTOR.
LELAND E. LEIST
BY
ATTY.

United States Patent Office 2,920,668
Patented Jan. 12, 1960

2,920,668
HACKSAW
Leland E. Leist, Tarpon Spring, Fla.

Application March 17, 1959, Serial No. 799,865

5 Claims. (Cl. 145—31)

This invention relates to adjustable hacksaws.

An object of the invention is to provide a saw handle in which a hacksaw blade may be disposed at any selected portion of the blade and may be removably held firmly anchored in the handle;

Another object of the invention is to provide a hacksaw having a handle adapted to retain a broken portion of a saw blade in operative position for sawing;

A further object of the invention is to provide a hacksaw having a blade that is adjustable lengthwise relative to a handle portion and having improved means for holding the blade firmly in the handle regardless of the adjusted position of the blade;

Still another object of the invention is to provide means for removably securing a saw-blade to its handle by clamping and imbedding the teeth of the blade, disposed within a handle, into rigid portions of the handle.

A still further object of the invention is to provide an adjustable hacksaw having a handle removably and slidably attached to both the blade and frame of the saw and having means for firmly attaching the handle to said frame and blade at selected positions of the blade relative to the handle.

Other objects and advantages of the invention will be made manifest by the following description of the invention in connection with the drawing wherein:

Figure 1 is a side elevation of a hacksaw embodying the invention;

Figure 2 is a sectional view taken along line 2—2 of Fig. 1;

Figure 3 is a side elevation of a modification of the hacksaw shown in Fig. 1; and Figure 4 is a sectional view taken along line 4—4 of Fig. 3.

Referring now to the drawing in detail, it will be seen by reference to Fig. 1 that the invention comprises a pistol-type handle referred to generically as 10 and a saw blade 11 the latter being of the usual type now in commercial use. Handle 10 is preferably composed of aluminum and includes a back plate 9 having a pistol grip 12, trigger 13, a milled groove 14 and screw holes 15, and also a front removable clamping plate 16 with screw holes 17. By reference to the drawing it will be seen that the screw holes in said back plate and front plate are so disposed relative to each other so as to receive cap screws whereby plates 16 and 9 may be drawn forcibly toward each other.

To provide the assembly shown in Fig. 1 screws 18 and plate 16 are removed and saw blade 11 placed in groove 14 with any length of the blade desired protruding forwardly of the handle from said groove. With the blade disposed as just described plate 16 is screwed into position by cap screws 18 as illustrated in Figs. 1 and 2. The depth of groove 14 is deep enough to accommodate the smooth portion 19 of the blade 11 but not deep enough to accommodate the set teeth 20 thereof. It is to be understood that the depth of groove 14 may be varied according to varying thickness of blade 11. For example if the thickness of the smooth portion of the blade from the teeth to the back of the blade is gradually thinned to prevent jamming the kerf groove 14 will be modified to accommodate such condition. However, in all cases the present invention requires that the teeth of the saw must be firmly clamped between plates 9 and 16 as screws 18 are tightened.

While applicant prefers to use aluminum for the holder he does not so limit the invention as obviously other materials may be used the requisite characteristic being that the material is strong enough to function as a handle and soft enough that teeth 20 will imbed in at least one of plates 9 and 14 when the teeth are forcibly pressed thereagainst. Referring to Fig. 2 there is illustrated there plates 9 and 14 drawn together with teeth 20 imbedded in both plates. This is the ideal clamping condition and it is to be noted that a substantial length of the blade is clamped within the handle so that slipping of the blade relative to the handle cannot occur.

It will now be seen that pieces of a broken hacksaw blade if of sufficient length for the holder to function, as explained above, may be saved by the use of the handle 10 therewith.

Some sawing operations and sometimes the lack of skill of the operator subjects a hacksaw blade to unusual strains that tend to break or damage the blade. To provide additional insurance against injury to the blade applicant has provided means on the handle to cooperate with an over rail of a saw frame as will be seen by reference to Figs. 3 and 4.

In the modification shown in Figs. 3 and 4 the blade 11 and handle 10 are unchanged except plate 9 (Fig. 2) has been modified by casting integrally therefith or by any suitable attachment means an arm 30 extending to a saw rail 31. Arm 30 terminates at its outer end in a looped portion 33 that provides an eye through which rail 31 may slide. A set screw 34 as shown in Figs. 3 and 4 is provided to clamp arm 31 in fixed relation with rail 31 when handle 10 has been clamped to the saw blade. It is to be understood and it will be seen by reference to Fig. 3 that rail 31 functions as the usual hacksaw frame when rail 31 is fixedly attached to handle 10 through the medium of arm 30, loop 33 and thumb screw 34. While saw frames that are adjustable for conventional saws of different lengths, so far as it has been able to learn, not until the present invention has there been any disclosure of a saw handle that was concurrently slidable along the blade and the frame. The cooperation and interdependence of these combined features will be readily apparent to those familiar with the art as will the usefulness of same.

The detailed descriptions of the particular embodiments of the invention illustrated and described herein is not to be construed as limiting the invention thereto. The invention includes all features of patentable novelty residing in the foregoing description and the accompanying drawings.

I claim:

1. A hacksaw comprising, a toothed blade and a handle, said handle including two cooperating plates, one said plate having an elongated groove opening toward the other of said plates, a substantial length of said blade being disposed in said groove, said groove having a depth of approximately the thickness of the smooth portion of the saw blade but less than the thickness of the teeth portion thereof; screw means for removably joining said plates and for forcibly drawing the plates toward each other into contact with the saw teeth and imbedding points of the teeth in at least one of said plates, whereby the blade is firmly held in the handle.

2. A hacksaw comprising, a blade having smooth and toothed portions, a handle including two cooperating plates, one said plate having an elongated groove facing toward the other of said plates, a substantial length of said blade being disposed in said groove, said groove having a depth of approximately the thickness of the smooth portion of the blade but less than the thickness of the teeth portion thereof; said plates being composed of rigid material that is softer than the material of which said blade is composed; means for removably joining said plates and for forcibly drawing the plates transversely toward each other into contact with the saw teeth and thereby imbedding points of the teeth in at least one of said plates, whereby the blade is firmly held in said handle.

3. A hacksaw comprising, a handle and a toothed blade, said handle having an elongated groove therein, a length of said blade disposed in the groove, means for clamping the toothed portion of said blade forcibly against the side of the groove whereby points of the teeth are imbedded in the handle.

4. A hacksaw comprising, a frame, a blade and a handle; said frame having an over-rail extending longitudinally of the frame; said handle having an elongated groove to receive in removable relation a length of the blade therein, said handle also having a portion to receive in sliding relation the over-rail, in fixed relation to said handle at preselected positions.

5. A hacksaw including a blade frame and handle, said handle being removably attached to said blade and frame at predetermined positions longitudinally of the blade and frame, and means for shifting the handle to said positions and firmly attaching the handle to the blade and frame at any of said positions.

References Cited in the file of this patent

UNITED STATES PATENTS

| | | |
|---|---|---|
| 2,307,411 | Leatherman | Jan. 5, 1943 |
| 2,452,148 | Rhodes | Oct. 26, 1948 |
| 2,490,094 | Rogers | Dec. 6, 1949 |
| 2,609,020 | Becker | Sept. 2, 1952 |

FOREIGN PATENTS

| | | |
|---|---|---|
| 383,080 | Great Britain | Nov. 10, 1932 |